United States Patent [19]

Green

[11] 4,124,271

[45] Nov. 7, 1978

[54] FIBER OPTIC SWITCH AND CONNECTOR

[75] Inventor: William F. Green, Woodland Hills, Calif.

[73] Assignee: Transco Products, Inc., Venice, Calif.

[21] Appl. No.: 777,087

[22] Filed: Mar. 14, 1977

[51] Int. Cl.² .................................................. G02B 5/16
[52] U.S. Cl. ............................... 350/96.20; 350/96.22
[58] Field of Search ...................... 350/96 C; 250/229; 340/365 P

[56] References Cited

U.S. PATENT DOCUMENTS

| | | | |
|---|---|---|---|
| 3,519,116 | 7/1970 | Koehn | 250/229 |
| 3,999,837 | 12/1976 | Bowen et al. | 350/96 C |

FOREIGN PATENT DOCUMENTS 2,016,498 10/1971 Fed. Rep. of Germany ......... 350/96 B

OTHER PUBLICATIONS

IBM Tech Disc. Bulletin, vol. 18, No. 2, Jul. 1975 by Burke et al., "Fiber Optic Repeater Bypass Switch", pp. 481–482.

*Primary Examiner*—John K. Corbin
*Assistant Examiner*—Stewart Levy
*Attorney, Agent, or Firm*—Charles H. Schwartz

[57] ABSTRACT

A fiber optic switch for switching light energy between a plurality of fiber optic bundles, including a plurality of fiber optic connectors for transmitting light energy from individual ones of the plurality of fiber optic bundles to a plurality of individual internal fiber optic bundles, a switching structure for switching light energy between one of the individual internal bundles to individual ones of the remaining plurality of internal bundles and with the switching structure including slotted blocks and with the slots receiving and supporting the individual internal bundles in contiguous relationship, and means for providing relative movement between the slotted blocks to at least two positions for providing switching of transmitted light energy between individual ones of the internal fiber optic bundles.

21 Claims, 8 Drawing Figures

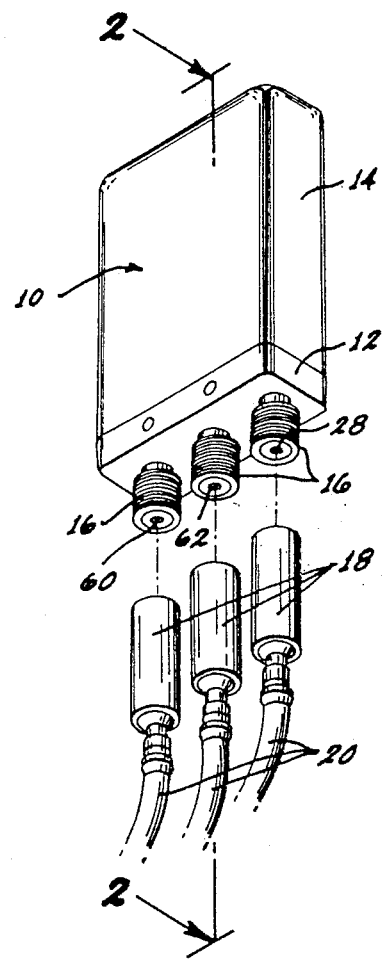
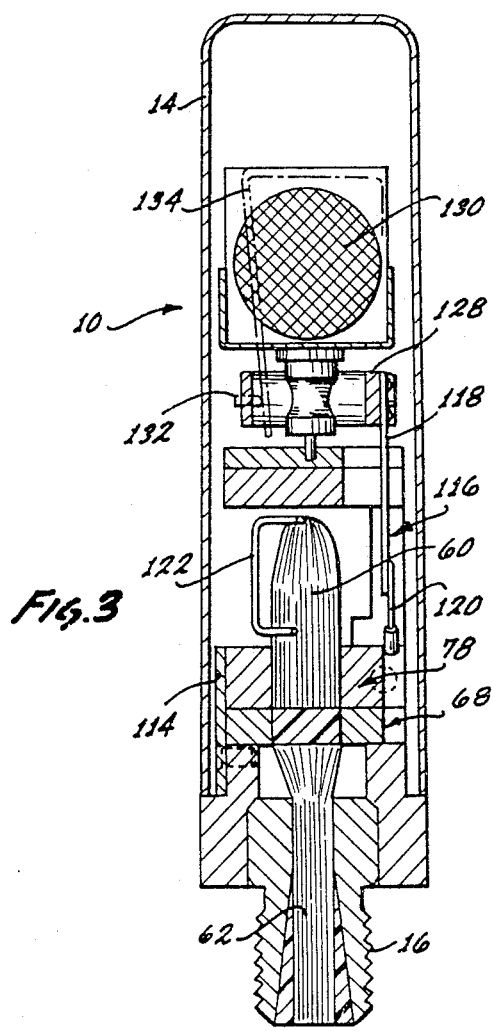
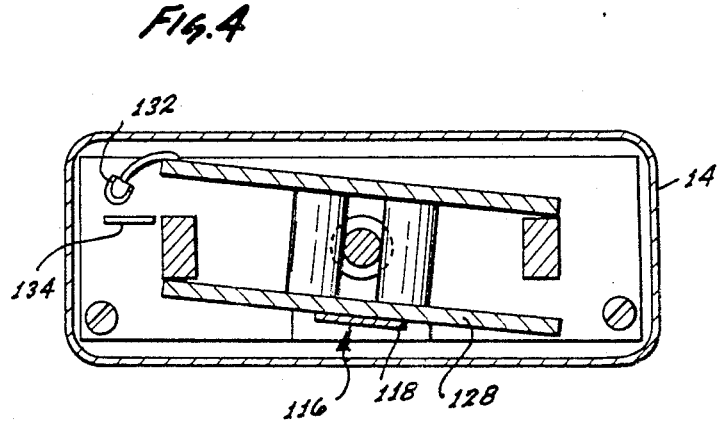

FIBER OPTIC SWITCH AND CONNECTOR

The present invention is directed to a fiber optic switch and connecter which provides for the switching of light energy from one fiber optic bundle to one of a plurality of other fiber optic bundles and also includes a connector for connecting the fiber optic bundles to the switch or to another fiber optic bundle.

With the increasing use of fiber optics to provide for the transmittal of information, it is necessary to provide for reliable fiber optic switches and connectors which are simple in construction and operation. For example, it is often desirable to provide for switching of the information transmitted along fiber optic bundles from a first bundle to one of a plurality of other bundles. In addition, it is necessary to provide for a fiber optic connector when providing for connection to the fiber optic switch. The present invention includes a simple and reliable fiber optic connector and this connector could also be used apart from the switch for connecting together two fiber optic bundles.

In the past fiber optic switches and connectors have been fairly cumbersome and difficult to use. In addition, many of these switches and connectors have been relatively expensive which, in turn, increases the overall cost of a system incorporating fiber optics. The present invention is directed to a fiber optic switch and connector which is inexpensive in cost and relatively simple in construction so as to allow for the transmittal of information using fiber optics.

Specifically, the connector portion of the invention includes a male section and a female section and with the male section including a body portion to provide the main support for the optical fibers. The optical fibers may be locked in place and centered by a tapered locking sleeve which is received within a complementary tapered portion of the body portion of the male section. The female section may also include a similar body portion and with a complementary tapered locking sleeve received within the body portion to lock and center the fibers in position.

As indicated above, the locking sleeves provide for centering the fiber optic bundles along the body of the connector to ensure for accuracy in the transfer of light energy between the male and female sections. The male and female sections also include complementary tapered portions at their front faces so that as the male and female sections are mated the tapered portions mate and provide for an accurate alignment between the fiber optic bundles.

The fiber optic switch uses a minimum of three connectors to provide coupling from one fiber optic bundle to either one of the other fiber optic bundles through the switch and with all of the fiber optic bundles connected to the switch by the connectors. The switch includes internal fiber optic bundles for transmitting the light energy within the switch. One of the internal fiber optic bundles is captured and retained in a stationary alignment block and with the other internal fiber optic bundles retained in a movable alignment block. The movable alignment block is in sliding relation to the stationary block to provide for the switching of the fiber optics between bundles.

The alignment blocks are designed such that close tolerances are inherent between the blocks but without the necessity for individual blocks to be machined with close tolerances. This is accomplished by the initial use of a single member and with a single setup used to cut slots in the single member and with the member then cut to form the blocks. The slots receive the fiber optic bundles so that adjacent portions of the blocks were initially formed from the single member so that the tolerances between the adjacent portions are substantially identical.

A clearer understanding of the invention will be had with reference to the following description and drawings wherein FIG. 1 is a perspective view of the external configuration of a fiber optic switch constructed in accordance with the teachings of the present invention and including three connectors;

FIG. 3 is a side cross-sectional view of the fiber optic switch and connectors taken along line 3—3 of FIG. 2;

FIG. 4 is a top cross-sectional view of the fiber optic switch taken along line 4—4 of FIG. 2;

Figure 2:
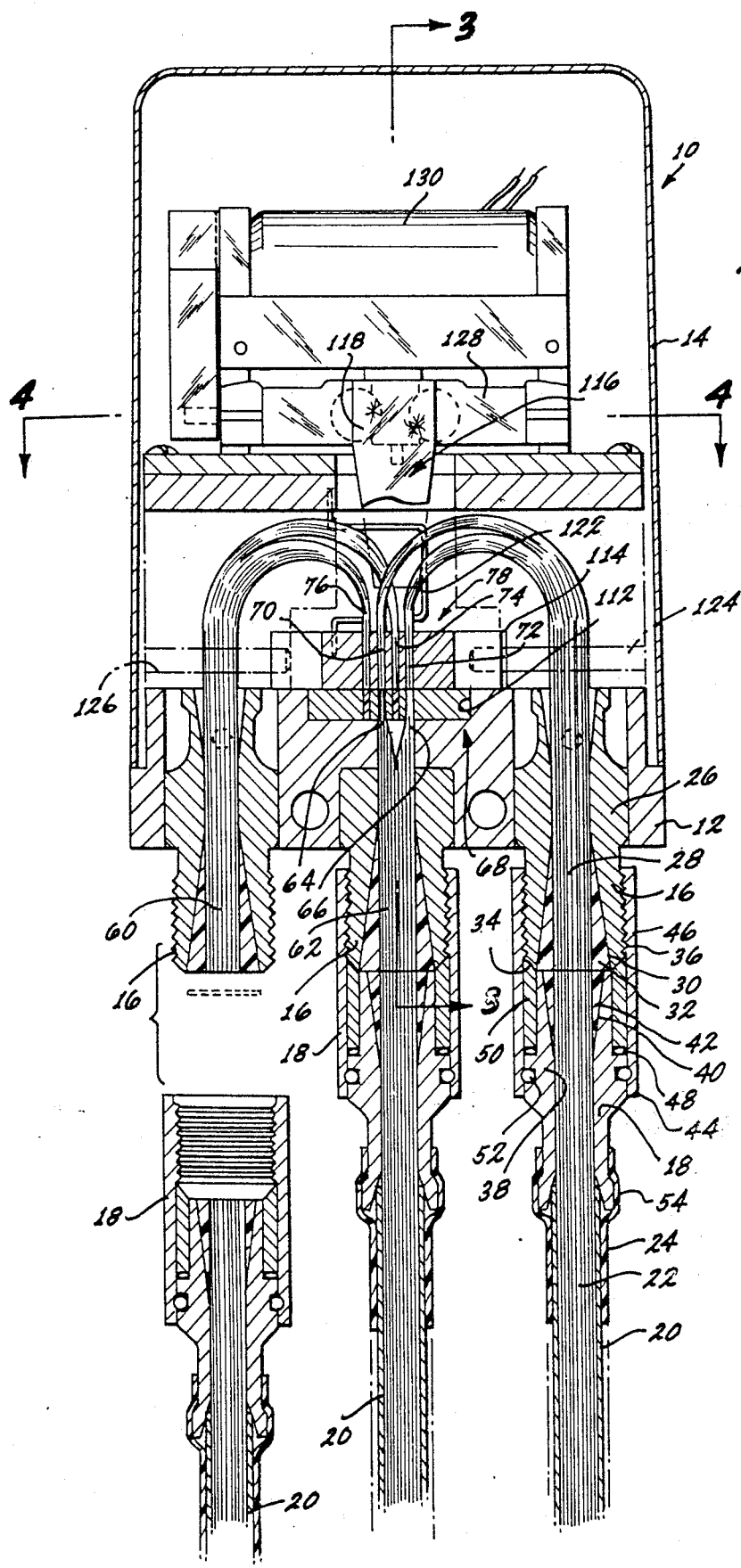
FIG. 2 is a cross-sectional view of the fiber optic switch and connectors of the present invention taken along line 2—2 of FIG. 1.

In FIG. 1, a fiber optic switch 10 is shown having a base member 12 and an outer cover 14. Extending from the base member 12 are three identical male connector sections 16. Three mating female connector sections 18 are shown and with fiber optic bundles 20 connected to the female sections 18 of the connectors.

In FIG. 2 a cross-section view of the fiber optic switch 10 and connectors is shown. Turning first to the connectors which, as indicated above, include a male section 16 and a female section 18, three such connectors are shown. It is to be appreciated that the connectors may be used separately apart from the switch so as to provide for the coupling together of fiber optic bundles such as bundle 20. As can be seen in FIG. 2, the fiber optic bundle normally includes a core of fiber optic material 22 which normally includes a plurality of optical fibers and with this core of fibers 22 covered with a sheath of flexible insulating material 24.

Using one of the male section 16 as an example, this section includes a body portion 26 which provides the main support for a bundle of fibers 28. The front portion of the body 26 includes a first tapered portion 30 surrounding the bundle 28 which tapered portion, for example, may have a 5° taper. A locking sleeve 32, having a matching 5° taper is used to lock and center the fibers within the body 26. A second tapered portion 34 on the front face of the body 26 which tapered portion may have a 45° taper is used to provide accurage alignment between the male and female sections of the connector. Additionally, the outer surface of the body portion 26 may have a threaded portion 26 which is used for mating the male and female sections.

The female section 18 also includes a body portion 38 which provides for the main support for the fiber optic bundle 22. The body portion 38 also has a tapered front portion 40 surrounding the bundle 22 which tapered portion may have the 5° taper. A tapered locking sleeve 42 has a complementary taper and is used to lock and center the fiber bundle 22 in position. In addition, the female portion 16 includes an outer nut 44 which has internal threading 46 to mate with the threading on the male section 16 so as to lock the connector together.

The body portion 38 of the female section 18 may include a recess portion between the body 38 and the nut 44 so as to receive an O-ring 48 and a guide ring 50. The front of the guide ring has a matching 45° angle so as to mate with the 45° angle on the front portion 34 of the male section 16. The outer nut 44 may be held in position by a lock wire 52 which is inserted through openings in the nut 44 and is positioned in a groove which extends around the body 38. As the nut 44 is rotated, the lock wire 52 slides in the groove while at the same time allowing the male and female sections to lock together.

In order to secure the fiber optic bundle 20, shrink sleeving 54 may be positioned over the end of the body portion 38 and extend down the length of the fiber optic bundle 20. By the application of heat, shrink sleeving 54 will shrink to provide for a tight fit to hold the fiber optic bundle 20 in place. It is to be appreciated that if the connector is used separate from the fiber optic switch 10, the fiber optic bundle 28 inserted through the male body portion 26 would also include an outer casing of insulating material such as material 24 and, in addition, shrink sleeving such as shrink sleeving 54 could be applied to the end of the fiber optic bundle 28 to maintain the bundle in position.

Normally, the connector sections would be assembled in the following fashion. The assembly of the female section is described first, but it is to be appreciated that the male section would be formed in a similar manner.

The sleeve or jacket 24 surrounding the bundle of fibers 22 is stripped back and the bundle of fibers 22 is fed through the connector body 38. The bundle of fibers 22 is then fed through the locking sleeve 42 when the locking sleeve is external of the connector body 38. Plastic material such as epoxy material is worked into the front recess formed by the tapered portion of the connector body 38 and the epoxy is also applied around the locking sleeve. The locking sleeve 42 is then pressed into the tapered portion 40 of the connector body 38 to lock the fiber optic bundle 22 into the connector body and also to center the bundle in position. After the epoxy has cured, the bundle of fibers, and any extension of the locking sleeve, is cut off and the front face is ground and polished. As indicated above, the bundle jacket 24 may be held in place by the use of shrink sleeving 54.

As indicated above, the male connector may be formed in the same way with the bundle of fiber optics 28 fed through the body 26 and the locking sleeve 32. The epoxy material is then worked into the recess formed by the tapered portion 30 and the epoxy is applied around the locking sleeve 32. The sleeve 32 is then pressed into the tapered portion of the body to center the bundle and to lock the bundle tightly in place. The front face of the male section may then be ground and polished as with the famel section.

The particular tolerances that should be maintained for the connector is the concentricity between the tapers such as the 45° taper on the front faces and guide ring of the body portions of the male and female sections and the 5° tapers for the body portions as well as the matching tapers of the locking sleeves. The concentricity of these two tapers should be reasonably close and should match with the concentricity of the threads provided on the outside of the body potion 26 and the inside of the nut 44 so that when the front surfaces are ground flat a close contact and a centering will be maintained between the two fiber optic bundles 22 and 28.

After the female section has been prepared as indicated above, then the O-ring 48 is slipped over the body portion and the guide ring is also slipped over the body portion. The nut member 44 is then slipped over the female section and locked in place for rotation by the lock wire 52 as described above.

In addition to the concentricity of the tapers, the concentricity of the outer diameter of the connector body 38 forward of the shoulder portion should be maintained, as well as maintaining the fit between this outer diameter and the inner diameter of the guide ring 50.

In order to provide for the connection between the male and female sections after they have been assembled as described above, the following procedure is as follows. First, a drop of optic oil which matches the index of refraction of the fiber optic material is placed onto the surface of either or both of the male or female sections. The nut member 44 is started onto the threads 36 of the male section. As the nut is tightened, the guide ring 50 of the female section will pick up the 45° taper at the front of the male section and with continuing tightening of the nut the guide ring 50 will center the two parts. As the tightening continues, the O-ring 48 will compress until the front surfaces of the bundles 22 and 28 will mate with the optic oil forming a low loss optical connection.

The specific arrangement of the connector allows accurate alignment of the optic bundles with a minimum amount of close tolerance machining of the parts. Because of this arrangement, the connector provides for a basic simplicity in both machining and assembly. In addition, the connector structure provides for a relatively thin profile connector which will fit within standard allowable spacing.

Figure 5:
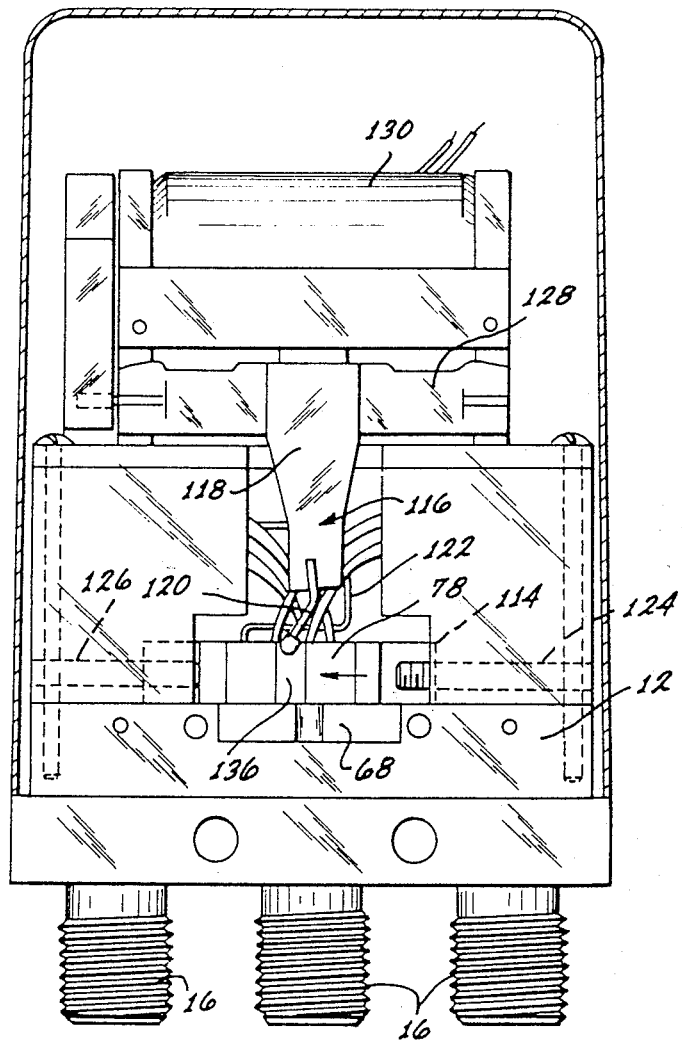
FIG. 5 is a front view of the fiber optic switch showing the cover partially cut away.

As shown in FIGS. 1, 2 and 5, three connector connections are made to the fiber optic switch 10 so as to provide for the transfer of light energy from an external bundle of optical fibers and to provide for the switching of this light energy between one of two output bundles. As shown in FIG. 1, the switching is accomplished through the use of internal fiber optic bundles, one of which has been designated by reference numeral 28. The other internal bundles are designated by reference numerals 60 and 62. The switching is provided from bundle 62 to either bundle 28 or bundle 60. As explained above, substantially identical connector members having male and female portions are used to provide coupling to each bundle of optical fibers.

The internal bundle 62 is split into two segments 64 and 66 which segments are individually incorporated in a stationary block 68. The internal bundles 28 and 60 are also each split into two segments such as segments 70 and 72 for bundle 28 and segments 74 and 76 for bundle 60 and these four segments are incorporated in a movable block 78. In the switch position of the fiber optic switch shown in FIG. 2, the light energy from the bundle 62 is transferred to the budle 28. When, however, the block 78 is moved to the right, the light energy from the input bundle 62 is transferred to the bundle 60.

Figure 6:
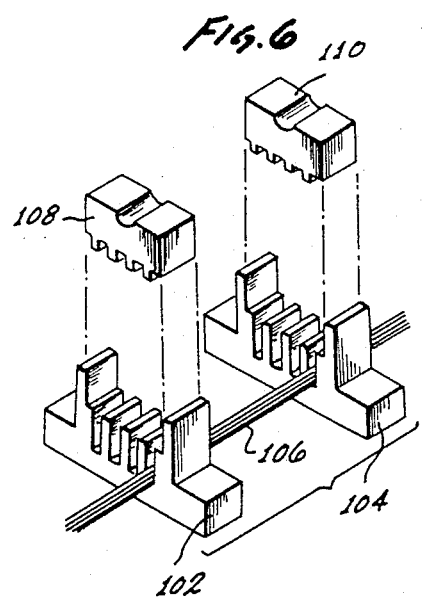
FIG. 6 illustrates the slotted blocks of the switch for holding the fiber optic bundles and for providing the relative motion to produce the switching action.
Figure 8:
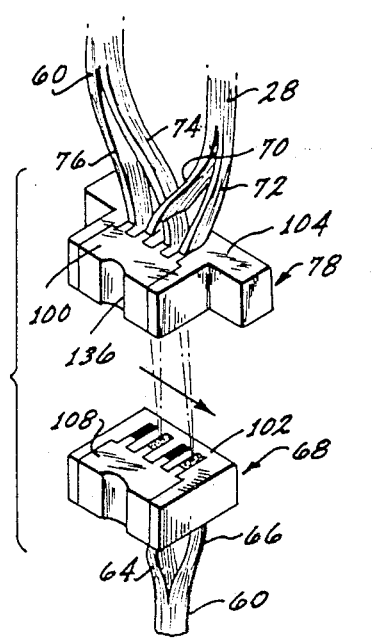
FIG. 8 illustrates the slotted blocks assembled with fiber optic bundles and illustrating the relative movement of the slotted blocks.
Figure 7:
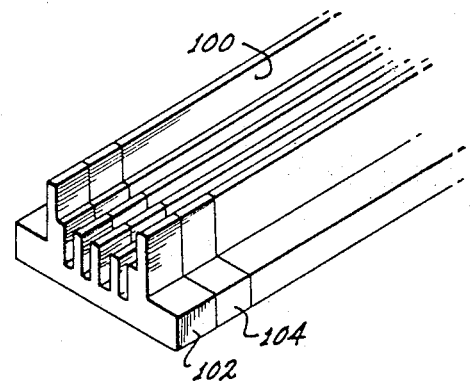
FIG. 7 illustrates an elongated slotted member from which the slotted blocks of FIG. 6 are formed.

The actual formation of the blocks 68 and 78 and the positioning of the segments can be seen with reference to FIGS. 6, 7 and 8. For example, in FIG. 7 a large single member 100 is shown and the single member 100 may be machined to provide for a plurality of slots which receive the segments. The depth of the slot is critical but this is controlled since the slots may be cut in a single setup. In addition, the width of the slot is critical but this, again, is controlled since the same cutter can be used for cutting all of the slots. The only dimension that must be controlled by accurate measurement is the spacing between the slots.

After the single member 100 has been machined as shown in FIG. 7, adjacent slices 102 and 104 are used as the basic structural elements to form the stationary and moving blocks 68 and 78. Since adjacent slices from the same single member 100 are used, the tolerances between each block such as the size and depth of the slots are controlled since these tolerances cannot vary in any significant degree between adjacent slices.

As shown in FIG. 3 and as illustrated using only a single slot, fibers 106 may be loaded into the slot and can be locked into place with a plastic material such as an epoxy. Actually, the blocks 102 and 104 may be closely positioned relative to each other as the fibers are loaded into the slots, so that the fibers between the adjacent blocks are in the same essential configuration. All four of the slots in each block 102 and 104 would be loaded with the fibers in the same manner. The fibers can be pressed and locked into position using comb lock members 108 and 110 and the epoxy material. After the epoxy has completely cured, then the fibers extending between the blocks 102 and 104 may be cut and with the opposing faces polished flat.

As shown in FIG. 8, the movable block 78 now has four fiber segments 72 through 76 which may be formed into the two bundles 28 and 60. For the stationary block 68 two of the fiber segments are cut off so that these fiber segments are merely dummies within the block 68 and with the remaining two fiber segments 64 and 68 formed into the single bundle 60. In one position of the switch, the individual fibers between the blocks 68 and 78 are substantially in line since they were formed from the same fibers laid between the two blocks. In the other position of the switch the fibers are still closely aligned since the blocks were machined from a single element 100 shown in FIG. 7 and with adjacent slices used to form the stationary and movable blocks.

The stationary block 68 is positioned within a recess 112 within the base portion 12 and with the internal bundle 62 of fibers extending through the connector portion and assembled in position as described above. The stationary block 68 may actually be cemented within the recess and with its face ground flush to the upper face of the base member 12. The sliding block 78 is mounted over the stationary block and partially overlaps the upper surface of the base 12 to slide relative to the stationary block 68 between the two switch positions. As shown in FIG. 3, the movable block 78 is maintained against a slide base 114 by the spring tension of an actuating arm 116. Specifically, the actuating arm 116 as shown in FIGS. 3 and 5 includes a spring member 118 and an arm member 120. The actuating arm 116 provides for a force to push the movable block 78 against the slide base 114 during movement of the movable block 78 in the direction shown by the arrows in FIGS. 5 and 8. The movable block 78 is held against the stationary block 68 by a preload spring 122 so that as the movable block 78 is moved the movable block is kept in engagement with the stationary block 68. The side to side adjustment of the movable block at the end positions is controlled by adjustable screw members 124 and 126.

The actuating arm 116 is attached to the front surface of a rotating member 128 which is part of a solenoid structure. Specifically, the solenoid includes a coil 130 which, when energized, provides for rotation of the member 128. The member 128 includes an arm 132 which engages a return spring 134 so that the solenoid is normally biased in one direction. It is to be appreciated that the actuating structure may take many forms and the specific solenoid structure as shown is merely representative of a particular actuator which may be used.

When the coil 130 is energized, the rotating member 128 rotates which in turn provides for rotation and also for transverse motion of the actuating arm 116. The arm portion 120 of the actuating arm 116 engages a recess 136 in the movable block 78 to provide for transverse movement of the movable block 78 as shown by the arrow in FIG. 5. The movement of the movable block provides for a coupling of the light energy from the bundle 62 to the bundle 60. When power is removed from the solenoid and solenoid being normally biased by the spring 132 and arm member 134 provides for the movable block 78 to be returned to the position shown in FIG. 2 wherein light energy is coupled between the bundle 62 and the bundle 28.

By using the fiber optic switch of the present invention, it is possible to provide for precise alignment and in one position actual fiber-to-fiber alignment without expensive precision machining. In addition, the switch can be incorporated into fairly standard structures already used for switching mechanisms and the actuation may be provided by relatively standard actuating mechanics. The switch when in either of its positions provides for a relatively rugged construction suitable for vibration and shock environments and produces a reliable transfer of the light energy even under these vibrations and shock conditions. This is in contrast to the use of lenses and prisms which have been used in the past. The switch of the present invention is quite adaptable to the use of different fiber systems and also to the use of different types of fiber optic cable systems which are in use. Most importantly, however, because of the relatively simple construction and the simple machining which is required, the system provides for precision alignment so that a low-loss switching system is produced at relatively low cost.

Although the present invention has been described with reference to particular embodiments, it is to be appreciated that various adaptations and modifications may be made and the invention is, therefore, to be limited only as indicated by the scope of the appended claims.

I claim:

1. A fiber optic switch for switching light energy from a first input bundle of optic fibers to one of at least two output bundles of optic fibers, including,
    a first fiber optic connector for receiving and transmitting the light energy transmitted from the first input bundle of optic fibers to a first internal fiber optic bundle,
    second and third fiber optic connectors for receiving and transmitting the light energy transmitted to one of the at least two output bundles of optic fibers to second and third internal fiber optic bundles, a first block including at least one opening extending through the block for receiving the first internal fiber optic bundle within the opening and with the block including a face portion and with the opening and the first internal bundle terminating at the face portion, a second block including at least two openings extending through the block for individually receiving the second and third internal fiber optic bundles within the openings and with the block including a face portion and with the openings and the second and third internal bundles terminating at the face portions and with the face portions of the first and second blocks contiguous to and in sliding engagement with each other, means for providing relative movement between the first and second blocks to at least two positions and with the first and second internal bundles aligned to transfer light energy between the first and second internal bundles in the first position and the first and third internal bundles aligned to transfer light energy between the first and third internal bundles in the second position.

2. The fiber optic switch of claim 1 wherein the blocks are initially formed from a single member split to form the separate blocks and with the openings machined in the single member for providing close tolerances betwen the blocks to minimize light loss during transfer of light energy.

3. The fiber optic switch of claim 2 wherein the single member is machined to provide a series of adjacent slots to form the openings for receiving the fiber optic bundles.

4. The fiber optic switch of claim 1 wherein the first block has a plurality of regularly spaced openings and with the first internal bundle split into a complementary plurality of branches and with each branch received in an opening and wherein the second block has at least two pluralities of regularly spaced openings and with the second and third internal bundles split into complementary pluralities of branches and with each branch received in an opening and the two pluralities of openings interleaved and with each plurality of openings in the second block complementary to the plurality of openings in the first block.

5. The fiber optic switch of claim 4 wherein the faces of the blocks are flat and wherein the relative movement between the blocks is along a straight line.

6. The fiber optic switch of claim 1 wherein the connectors have mating male and female sections and with each fiber optic bundle extending through the secitons and with each section having a tapered portion surrounding the fiber optic bundle and with a complementary tapered sleeve extending into the tapered portion to center and lock the fiber optic bundle within the section.

7. The fiber optic switch of claim 6 wherein the mating portions of the male and female sections including complementary tapered portions to accurately align the mating male and female sections.

8. A fiber optic switch for switching light energy between a plurality of fiber optic bundles, including, a plurality of fiber optic connectors for transmitting light energy from individual ones of the plurality of fiber optic bundles to a plurality of individual internal fiber optic bundles, a switching structure for switching light energy between one of the individual internal bundles to individual of the remaining plurality of internal bundles and with the switching structure including slotted blocks located adjacent to each other and with each block including a face portion and with the slots receiving and supporting the individual internal bundles in contiguous relationship and with each individual internal bundle terminating at the face portions and with the face portions of the slotted blocks contiguous to each other, and means for providing relative movement between the slotted blocks to at least two positions for providing switching of transmitted light energy between individual ones of the internal fiber optic bundles.

9. The fiber optic switch of claim 8 wherein the slotted blocks are initially formed from a single member split to form the separate blocks and with the slots machined in the single member for providing close tolerances between the blocks to minimize light loss during transfer of light energy.

10. The fiber optic switch of claim 9 wherein the single member is machined to provide a series of adjacent slots to form the slots for receiving the fiber optic bundles.

11. The fiber optic switch of claim 8 wherein a first slotted block has a plurality of regularly spaced slots and with a first internal bundle split into a complementary plurality of branches and with each branch received in a slot and wherein a second slotted block has at least two pluralities of regularly spaced slots and with second and third internal bundles split into complementary pluralities of branches and with each branch received in a slot and the two pluralities of slots interleaved and with each plurality of slots in the second block complementary to the plurality of slots in the first block.

12. The fiber optic switch of claim 11 wherein the slots are located along flat faces of the blocks and wherein the relative movement between the blocks is along a straight line.

13. The fiber optic switch of claim 11 wherein the connectors have mating male and female sections and with each fiber optic bundle extending through the sections and with each section having a tapered portion surrounding the fiber optic bundle and with a complementary tapered sleeve extending into the tapered portion to center and lock the fiber optic bundle within the section.

14. The fiber optic switch of claim 13 wherein the mating portions of the male and female sections including complementary tapered portions to accurately align the mating male and female sections.

15. A fiber optic connector for providing the transfer of light energy between fiber optic bundles, including, a male section having a central opening for receiving a first fiber optic bundle and with the male section including a face portion and with the central opening and the first fiber optic bundle terminating at the face portion and with the central opening including an internal tapered portion terminating at the face portion and surrounding the first fiber optic bundle, a first external tapered locking sleeve terminating at the face portion and complementary to the tapered portion in the male section and with the first locking sleeve extending into the tapered portion and around the first fiber optic bundle to center and lock at the face portion the first fiber optic bundle within the male section, a female section having a central opening for receiving a second fiber optic bundle and with the female section including a face portion and with the central opening and the second fiber optic bundle terminating at the face portion and with the central opening including an internal tapered portion terminating at the face portion and surrounding the second fiber optic bundle, a second external tapered locking sleeve terminating at the face portion and complementary to the tapered portion in the female section and with the second locking sleeve extending into the tapered portion and around the second fiber optic bundle to center and lock at the face portion the second fiber optic bundle within the female section, and means for mating the male and female sections for providing transfer of light energy between the first and second fiber optic bundles.

16. The fiber optic connection of claim 15 wherein the male and female sections include mating portions extending from the face portions and wherein the mating portions include complementary tapered portions to accurately align the mating male and female face portions.

17. The fiber optic connector of claim 16 wherein the tapered locking sleeve having a taper of approximately 5° and the tapered mating portions have a taper of approximately 45°.

18. A fiber optic connector section for providing the transfer of light energy between fiber optic bundles, including, a connector section having a central opening for receiving a fiber optic bundle and with the connector section having a front face surrounding the opening and with the fiber optic bundle terminating at the face portion and with the central opening including an internal tapered portion extending inward from the front face to an interior portion of the connector section, an external tapered locking sleeve complementary to the tapered portion and with the locking sleeve extending into the internal tapered portion to surround and to center and lock the fiber optic bundle within the male section at the face portion, and the connector section including a mating portion for mating with a complementary connector section to provide for the transfer of light energy between the connector section and the mating complementary connector section.

19. The fiber optic connector section of claim 18 wherein the connector section forms a male section.

20. The fiber optic connector section of claim 18 wherein the connector section forms a female section.

21. The fiber optic connection section of claim 18 wherein the front face of the mating portion includes a tapered portion to cooperate with a complementary mating portion included in the complementary connector to align the connector sections during mating.

* * * * *